United States Patent [19]

Fujikawa et al.

[11] Patent Number: 4,889,089

[45] Date of Patent: Dec. 26, 1989

[54] WORK VEHICLE

[75] Inventors: Tetsuzo Fujikawa, Kobe; Makizo Hirata; Shinichi Tamba, both of Kakogawa, all of Japan

[73] Assignee: Kawasaki Jukogyo Kabushiki Kaisha, Japan

[21] Appl. No.: 214,833

[22] Filed: Jul. 1, 1988

Related U.S. Application Data

[63] Continuation of Ser. No. 808,290, Dec. 12, 1985, abandoned.

[30] Foreign Application Priority Data

Dec. 24, 1984 [JP] Japan ............................ 59-275671

[51] Int. Cl.$^4$ ............................................. A01D 35/26
[52] U.S. Cl. ............................... 123/195 HC; 56/14.7; 56/255
[58] Field of Search ....... 123/195 R, 195 HC, 196 W, 123/DIG. 7, 195 C, 55 VF, 195 S, 55 R; 56/10.1, 14.7, 255, DIG. 22

[56] References Cited

U.S. PATENT DOCUMENTS

| | | | |
|---|---|---|---|
| 3,706,186 | 12/1972 | Hurlburt et al. | 56/DIG. 22 |
| 3,851,631 | 12/1974 | Kiekhaefer | 123/55 R |
| 4,048,787 | 9/1977 | Harkness et al. | 56/255 |
| 4,159,613 | 7/1979 | Knudson et al. | 56/DIG. 22 |
| 4,198,947 | 4/1980 | Rassey | 123/DIG. 7 |
| 4,226,217 | 10/1980 | Haslbeck et al. | 123/195 C |
| 4,516,541 | 5/1985 | Yungclas | 123/196 W |
| 4,570,584 | 2/1986 | Uetsuji et al. | 123/195 HC |
| 4,570,587 | 2/1986 | Watanabe et al. | 123/195 HC |

FOREIGN PATENT DOCUMENTS 167875 10/1983 Japan ........................... 123/55 UF Primary Examiner—David A. Okonsky

[57] ABSTRACT

An improved work vehicle is disclosed in which a vertical shaft V-type engine having vertically supported crankshaft with the pair of right and left cylinders being arranged in V-shape is housed inside the front bonnet that is forwardly downwardly inclined at the top. The work vehicle, while having no less excellent performance in terms of power output, noise, and vibration, provides more increased operability and a wider range of forward visibility than conventional horizontal opposed type engine vehicles.

2 Claims, 3 Drawing Sheets

WORK VEHICLE

This application is a continuation of application Ser. No. 808,290, filed 12/12/85 and now abandoned.

BACKGROUND OF THE INVENTION

(1) Field of the Invention

This invention relates to a vertical shaft V-type engine work vehicle such as a power lawn mower.

(2) Description of the Prior Art

Some power garden machinery particularly for lawn mowing are equipped with vertical shaft V-type engines, with their crankshaft mounted in vertical position on the mower deck.

In relatively small-sized and hand-push type models, these engines are mostly of single cylinder arrangement. With some so-called riding type mowers and those hand-push models for commercial application, however, the horizontal opposed-type two-cylinder engine is employed in which the cylinders are arranged vertically, one above the other. One example of such an engine is shown in FIGS. 5 and 6, which is of side valve type.

The horizontal opposed-type engine shown has a pair of cylinders 18, each having a piston 19 mounted therein. The paired cylinders 18 are placed to axially oppose each other and each have a connecting rod 20. A crankshaft 11 is housed in a crankcase 17 and has a pair of crank pins 21 to which the connecting rods 20 are connected respectively.

However, these horizontal opposed-type engines have some dimensional disadvantages. First, as best shown in FIG. 5, because of the head-to-head arrangement of the paired cylinders 18, the constructed body of the engine comes to have an increased width W1. Thus, the bonnet in which the engine is installed necessarily becomes enlarged in lateral dimension in front of the operator. Secondly, as seen in FIG. 6, there is a limitation in reducing the engine height H1, without mention of the additional increase in height compared with the single-cylinder design. This limitation results from the fact that the technical need for operating the paired crank pins, which are jointed to their respective connecting rods on both side of the crankshaft (FIG. 5), in a displaced phase from each other, along with the minimum required rod length, does not allow the piston pin pitch P1, the distance between the two piston pins, to occur below a minimum distance. Consequently, the bonnet could not be smaller than a minimum height.

These increased height and width in the bonnet construction have resulted an increase in the range of dead ground just in front of the bonnet, to the great inconvenience of the operator particularly when he has to manipulate the machine near a tree or around the corner of a garden driving from the driver seat to make precise small turns or cornering.

SUMMARY OF THE INVENTION

It is this situation that gave rise to the present invention.

Thus it can be said that the main object of this invention is to provide an improved power lawn mower which, while having no less satisfactory performance in terms of power output, sound, and vibration, decreases more the field of dead ground increasing operator's ease of operation than conventional horizontal opposed-type engine equipped models.

To achieve the above and other objects, this invention has in the front bonnet a vertical shaft V-type engine having vertically supported crankshaft with the paired cylinders being arranged in V-shape.

These and other features and advantages of the present invention will be move fully understood and appreciated from the following description of specific embodiment taken together with the accompanying drawings.

DESCRIPTION OF THE PREFERRED EMBODIMENTS

A preferred embodiment of a vertical shaft V-type engine for power lawn mowers constructed in accordance with the present invention will be described in conjunction with the attached drawing.

Figure 1:
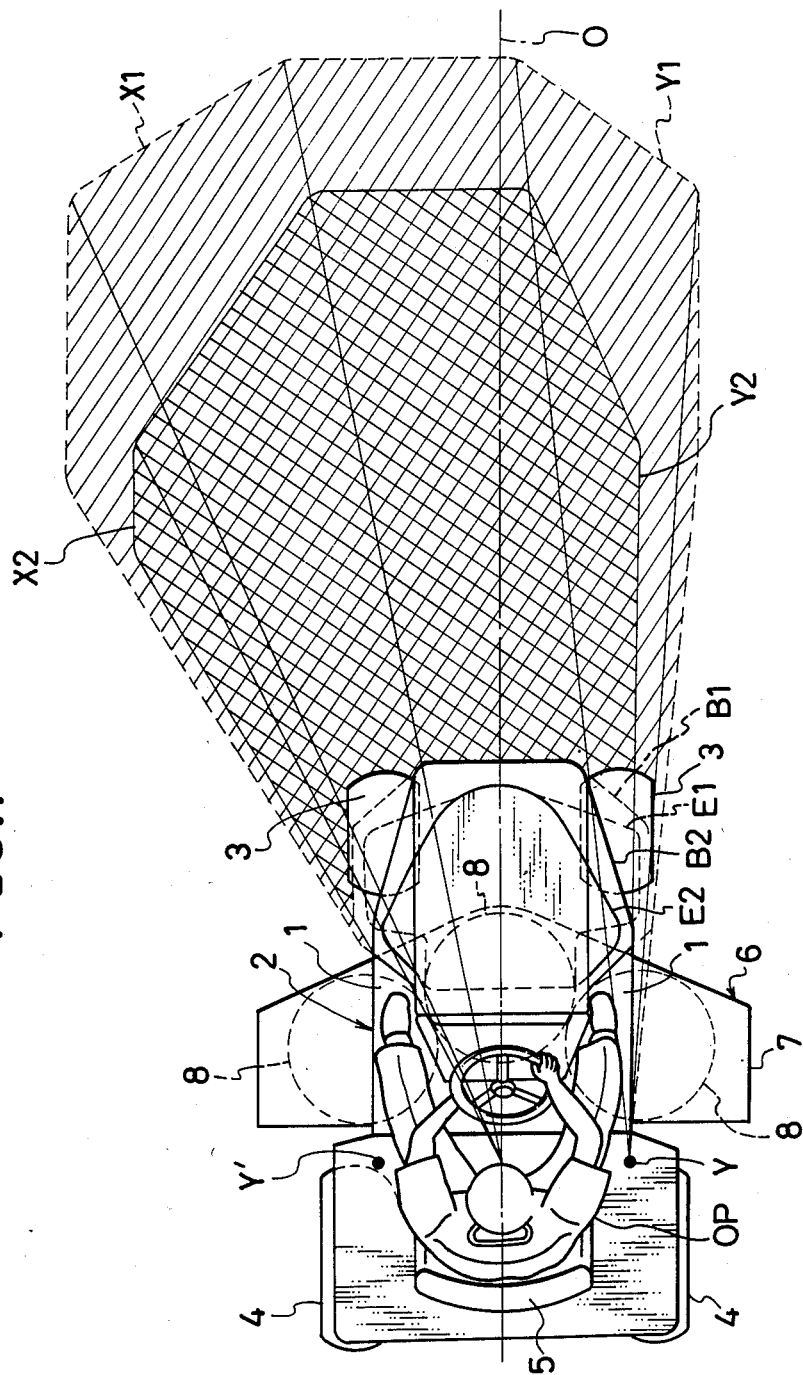
FIG. 1 is a plan view of lawn mowing machinery showing a comparison of the fields of dead ground produced by the conventional and the subject bonnet designs, respectively.

FIG. 1 shows by way of illustration a riding-type small-sized power lawn mower comprising a body 2 that has a cab floor 1. Also, the body 2 has at both ends of the floor 1 front and rear pairs of road wheels 3 and 4. In this embodiment, the rear road wheel pair is driven by the power system of the mower.

Figure 2:
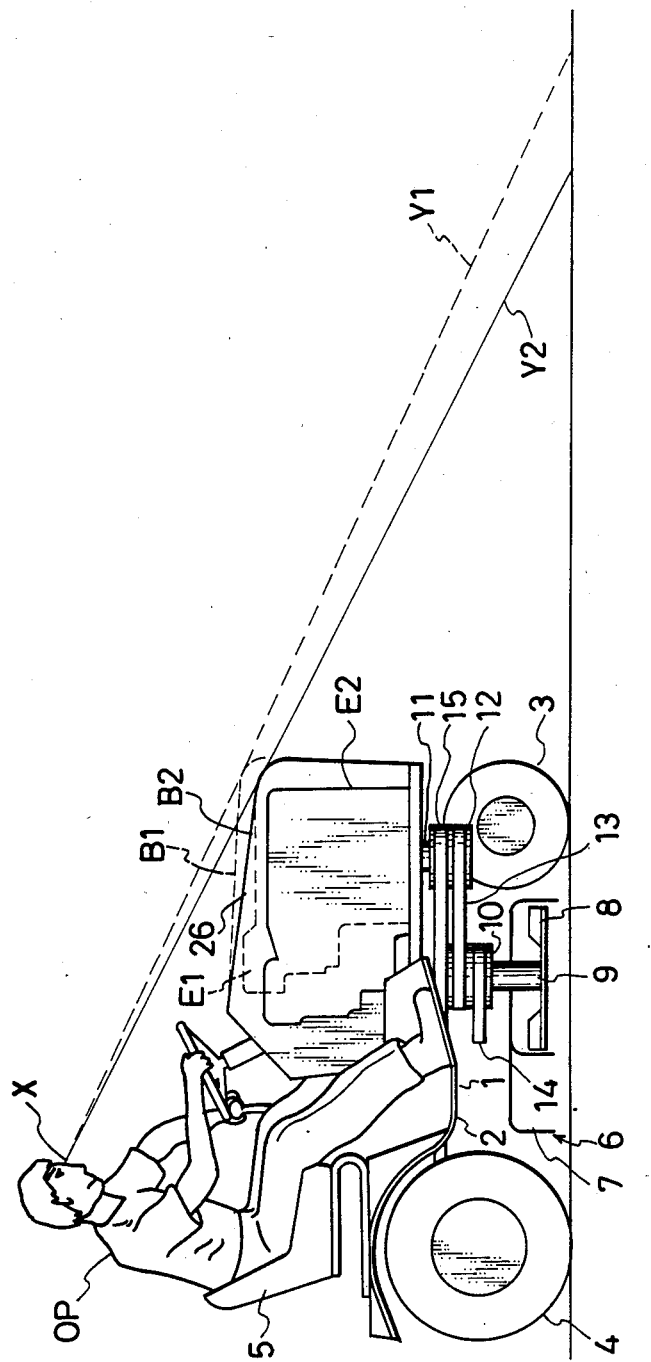
FIG. 2 is a side view showing a similar comparison.
Figure 5:
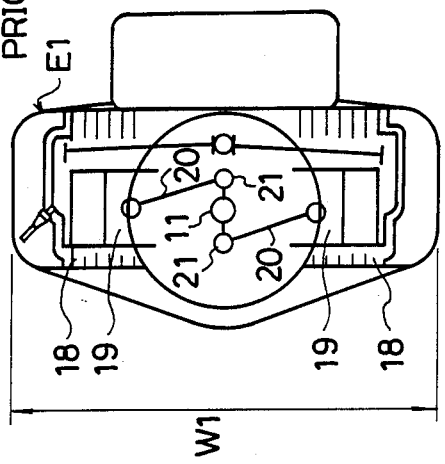
FIG. 5 is a plan view schematically illustrating the conventional horizontal opposed-type engine.
Figure 6:
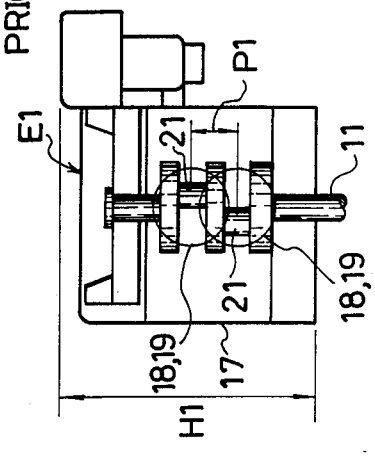
FIG. 6 is a side view of the engine of FIG. 5.

At the rear portion of the body 2 is installed an operator seat 5. Referring then to FIG. 2, a mower assembly 6 has a frame and three rotary mowing cutters 8 transversely arranged below the floor 1. The numeral 9 indicates a center shaft carrying the middle rotary cutter 8. The center shaft carries at its upper portion a driven pulley 10 which is driven through a first drive belt 13 from a drive pulley 12 that is operatively jointed to the lower end of a crankshaft 11. Each of the two outer rotary cutters 8 is driven by the center shaft through a second drive belt 14, as best shown in FIG. 1.

Also, the drive pulley 12 drives the rear road wheel pair 4 through a wheel drive belt 15.

Referring to both FIGS. 1 and 2, solid line E2 describes the contour of the vertical shaft V-type engine according to this invention as it is mounted in position on the vehicle. On the other hand, broken line E1, shown in the overlapped manner with the engine of the invention, follows the contour of the conventional horizontal opposed-type engine. In addition, solid line B2 describes the contour of the bonnet housing the engine of this invention whereas broken line B1 describes that of the bonnet for the conventional engine.

Figure 3:
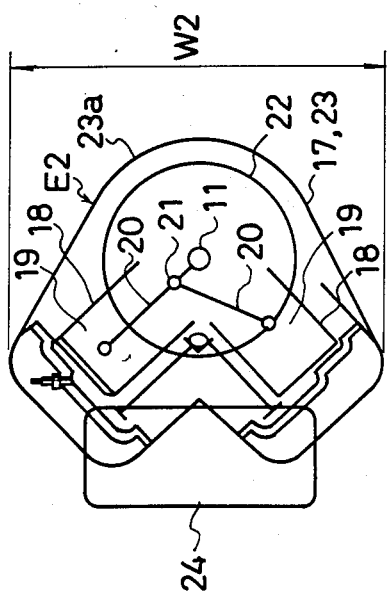
FIG. 3 is a plan view of a vertical shaft V-type engine according to the present invention.
Figure 4:
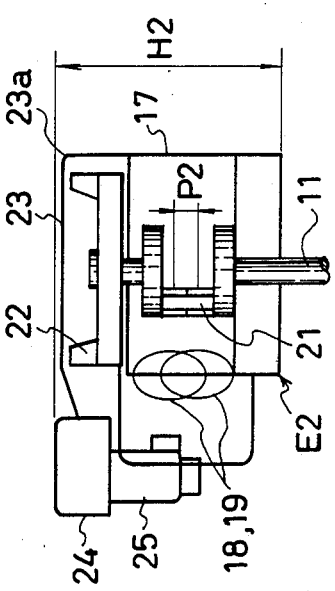
FIG. 4 is a side view of the engine of FIG. 3.

The vertical shaft V-type engine of this invention is shown in FIGS. 3 and 4.

The vertical shaft V-type engine E2 is of side valve type and has its crankshaft 11 supported in a crankcase 17. A pair of cylinders 18, arranged in V-shape, is largely symmetrically disposed with respect to the crankshaft 11. Each cylinder 18 has its piston 19 connected to the crankshaft through a connecting rod 20. A single crank pin 21 secures both connecting rods 20 to the crankshaft 11.

A cooling fan, largely designated at 22, is installed at one end of the crankshaft 11. A shroud 23 is provided to encase the cooling fan 22. At the rear part of the engine are mounted an air cleaner 24 and a carburetor 25.

Referring to FIG. 3, W2 indicates the width of the engine E2 of vertical shaft V-type design. The height H2 of the engine is determined by placing the crankshaft 11 in the vertical position, as shown in FIG. 4. Since the paired cylinders 18 are mounted in the engine body on the side of the operator seat, the crankcase 17 can be built to reduce in width toward the forward end, as shown in FIGS. 1 and 3. Further, the air cleaner 24, as an accessory of the engine, is located adjacent to the operator seat, as shown in FIG. 2, while the fan shroud 23 being mounted at the remote end of the engine from the operator seat, with its top forward portion (or shoulder part) truncated, as can be best shown in FIG. 4, so that the general outline enveloping the engine and its auxiliary equipment is wide at the rear end and narrow at the front end of the engine system.

Thus, the bonnet B2 constructed to accommodate the engine of V shape and its accessories can be configured to taper toward its forward end, as shown in FIG. 1, and, in addition, have its top side 26 more forwardly downwardly inclined as shown in FIG. 2, than conventional bonnet designs B1. What is contributing to increasing this downward inclination of the bonnet at its forward portion includes the unique design futures according to this invention, that is, employing the single crank pin 21 for two connecting rods, locating the air cleaner 24 at the rear end rather than at the conventional front end of the engine where it might result in an increase height of the bonnet at the front, and using the truncated shoulder 23a of the fan shroud 23 that is situated at the bonnet front portion.

With this configuration of the bonnet in the riding type power lawn mower, the field of front view obtained by the operator from his normal position in the visual point X at the operator seat, as defined by solid line X2 in FIG. 1, is enlarged more than possible with the configurations of conventional horizontal opposed-type engine bonnets where the field of front view obtainable might be as indicated by broken line X1, reducing the range of dead ground. In FIG. 1, both lines X1 and X2 are drawn to describe the right-side contour of the field of front view alone. However, it should be understood that this also applies to the leftside of the vehicle to complete the symmetry of the sight range with respect to the vehicle center line 0.

Referring again to FIG. 1, solid line Y2 defines the right edge of the field of front view obtainable by the operator when he tilts his posture to the right at his seat. It is appreciated that the range of dead ground determined by this solid line Y2 is decreased than what might be produced by the conventional bonnet configurations as indicated by broken line Y1. Likewise, the range of dead ground is decreased when the operator inclines his body to the left in the visual point Y' from the erect position, although the drawing refers to the case of right view field only.

FIG. 2 illustrates a similar comparison as viewed from the side of the vehicle.

The field of forward view represented in FIG. 2 should be regarded as one obtained from the operator in normal posture at the seat without tilting his body in either way.

As obvious from the drawing, the range of dead ground produced by solid line Y2 (from the bonnet shape according to this invention) is reduced than by broken line Y1 (from the conventional bonnet configuration), so that the operator aboard the power mower can attain increased efficiency and ease in driving, commanding a wider field of front view, particularly near a tree or around the corner of a garden.

Aside from the above-mentioned advantages associated with the field of front view, it has been found that the present invention has less vibrations. In more detail, while a primary couple occurs in the conventional horizontal opposed-type engine, the vertical shaft V-type engine according to this invention has a primary and a secondary couples. However, in the present invention, primary couples result in a reduced sensible vibration compared with conventional horizontal opposed-type engines because of the smaller piston pin pitch P2 and the possible correspondingly relatively lower gravity center of the engine. Further, the vertical shaft V-type engine of this invention is no less excellent than horizontal opposed-type engines in terms of power output and noise, since these engines are both of two-cylinder type. Although the above description refers to an air cooled engine, the same effects will equally be available with a water cooled engines.

It will be clear from the above that the present invention in which the vertical shaft V-shaped cylinder bank engine is installed at a location relatively remote from the operator seat inside the bonnet, while having no less excellent performance than conventional horizontal opposed-type engines with a comparable displacement in terms of power output, vibration, and noise, provides a wider range of front view adding much to operability.

It is to be understood that the invention is not limited to the precise construction shown, but that changes are contemplated as readily fall within the spirit of the invention as shall be determined by the scope of the appended claims.

What is claimed is:

1. In a work vehicle powered by a two-cylinder internal combustion engine encased in an engine compartment that is situated in front of a driver's station; the improvement which comprises said internal combustion engine being of a vertical crankshaft, V-type and having a connecting rod connected to each piston, a single crank pin on said vertical crankshaft adapted for connection to both of said connecting rods, said internal combustion engine having an enlarged upper cross-sectional area in a plane perpendicular to the crankshaft longitudinal axis due to the spreading of the cylinders in forming a V-block configuration, said enlarged engine area being located closer to said driver's station than the rest of said engine, said engine compartment including a hood forming portion which includes a front part that is forwardly declining and tapered along both sides thereof, said hood forming portion being shaped and sized so as to contain therein said engine in close surrounding.

2. The work vehicle defined in claim 1 wherein said engine includes an air cleaner and wherein the improvement further comprises mounting the air cleaner at the end of the V-shaped portion of the engine closest to the driver's station.

* * * * *